United States Patent [19]

Laurent

[11] Patent Number: 5,377,180
[45] Date of Patent: Dec. 27, 1994

[54] DATA SWITCHING DEVICE

[75] Inventor: Raymond Laurent, LaVille du Bois, France

[73] Assignee: U.S. Philips Corporation, New York, N.Y.

[21] Appl. No.: 987,521

[22] Filed: Dec. 8, 1992

[30] Foreign Application Priority Data

Dec. 23, 1991 [FR] France ................. 91 16033

[51] Int. Cl.$^5$ ............... H04L 1/22; H04L 12/50
[52] U.S. Cl. .................. 370/16; 370/58.1; 340/827
[58] Field of Search ........... 370/16, 59, 60, 60.1, 370/63, 64, 13, 14, 58.1, 58.2; 340/825.03, 826, 827, 825.06, 825.16

[56] References Cited

U.S. PATENT DOCUMENTS

| | | | |
|---|---|---|---|
| 4,276,637 | 6/1981 | Le Dieu | 370/16 |
| 4,455,645 | 7/1984 | Mijioka et al. | 370/16 |
| 4,679,186 | 7/1987 | Lea | 370/16 |
| 5,014,261 | 5/1991 | Shinbashi et al. | 370/16 |
| 5,146,452 | 9/1992 | Pekarske | 370/16 |
| 5,182,764 | 1/1993 | Askew et al. | 370/16 |

FOREIGN PATENT DOCUMENTS 0006214 9/1980 European Pat. Off.
WO9013957 11/1990 WIPO.

OTHER PUBLICATIONS

Search Report.

*Primary Examiner*—Benedict V. Safourek
*Assistant Examiner*—Huy D. Vu
*Attorney, Agent, or Firm*—David R. Treacy

[57] ABSTRACT

Switching modules of a digital network switch have switching ports connected to external ports by a connections network. The modules are arranged in groups. Some of the connection ports of the switching modules in each group are designated for back-up use within that group. In the event of failure of a module in a group, the connections network serving that group is controlled to connect back-up ports in that group to the affected external ports.

14 Claims, 3 Drawing Sheets

DATA SWITCHING DEVICE

BACKGROUND OF THE INVENTION

The invention relates to a data switching device comprising external ports for connection to the exterior, switching modules having switching ports connected to the external ports by means of a connections network.

Such a device is widely used for concentrating or switching data from terminals or modems.

This type of device is required to have a certain degree of insusceptibility to failure. Thus, failure of a single module should not cause the entire device to be rendered unserviceable and thereby inflict substantial nuisance on the external subscribers connected to the device.

The international Patent Application WO 90/13957 describes a device of this type in which steps have been taken to correct for failure of one of the modules; therefore, if a module fails a replacement module is called upon.

However, the procedure adopted in this known device has some drawbacks.

It is not certain that the replacement module is in good working order when put into operation.

It is necessary to provide a connection network for this auxiliary module, which becomes more difficult as the capacity of the switching device increases.

SUMMARY OF THE INVENTION

In order to mitigate these drawbacks to a satisfactory extent the invention is characterized in that a certain number of connection ports of the modules are designated for backing-up, and connection network is adapted to connect said back-up ports to the external ports to be backed up.

The invention will now be described in more detail, by way of example, with reference to the accompanying drawings.

DESCRIPTION OF THE PREFERRED EMBODIMENT

Figure 1:
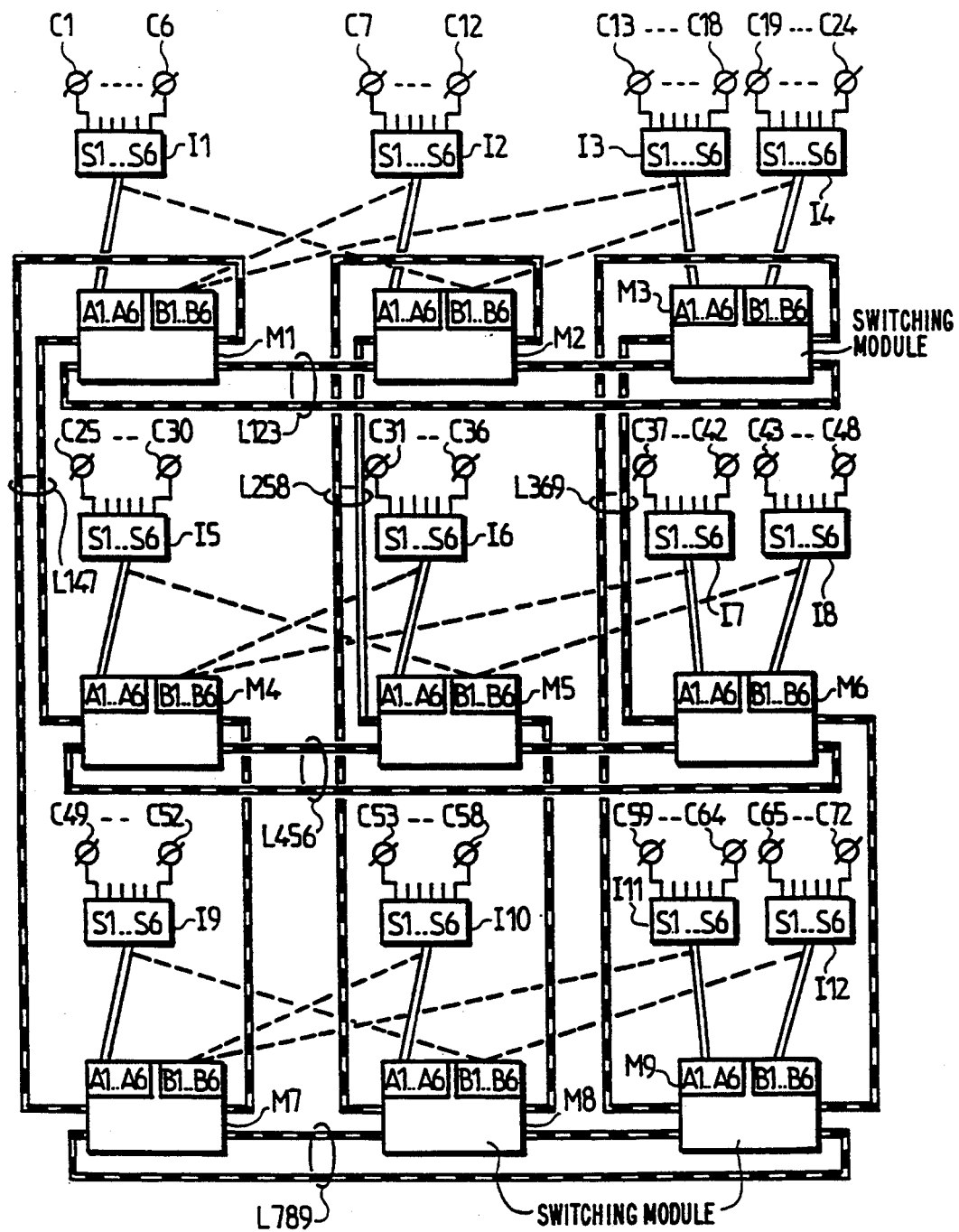
FIG. 1 shows the diagram of a switching device in accordance with the invention.

The device shown in FIG. 1 comprises a certain number of switching modules M1, M2, M3, M4, MS, M6, M7, M8 and M9. Each of these modules comprises two groups of six switching ports each: A1, ..., A6 for the first group and B1 ..., B6 for the second group. These different groups of switching ports are connected to external ports C1 to C72 by means of interface circuits I1 to I12, which regroup 6 external ports each. These circuits enable subscriber circuits of different natures (terminals, modems ...) to be connected to the switching ports. The (6) outputs of the interface circuits are connected to the switching ports A1, ..., A6, B1, ..., B6 of the modules M1 to M9 by means of a connection network shown diagrammatically in broken lines and double lines in FIG. 1.

It is to be noted that the exchange of information between modules is effected by links.

Thus, the modules
M1, M2 and M3 are interconnected by the link L123
M4, M5 and M6 are interconnected by the link LA56
M7, M8 and M9 are interconnected by the link L789
M1, M4, M7 are interconnected by the link LI47
M2, M5, M8 are interconnected by the link L258
M3, M6, M9 are interconnected by the link L369.

A connection network connects the six output ports (S1 ..., S6) of the circuits to the switching ports of the switching modules. In FIG. 1 this network is shown simply in double lines and broken lines.

Thus, in accordance with the invention, when the device is in its correct and normal mode of operation the outputs
S1 to S6 of the circuit I1 are connected to the ports A1 to A6 of the module M1,
S1 to S6 of the circuit I2 are connected to the ports A1 to A6 of the module M2,
S1 to S6 of the circuit I3 are connected to the ports A1 to A6 of the module M3,
S1 to S6 of the circuit I4 are connected to the ports B1 to B6 of the module M3,
S1 to S6 of the circuit I5 are connected to the ports A1 to A6 of the module M4,
S1 to S6 of the circuit I6 are connected to the ports A1 to A6 of the module MS,
S1 to S6 of the circuit I7 are connected to the ports A1 to A6 of the module M6,
S1 to S6 of the circuit I8 are connected to the ports B1 to B6 of the module M6,
S1 to S6 of the circuit I9 are connected to the ports A1 to A6 of the module M7,
S1 to S6 of the circuit I10 are connected to the ports A1 to A6 of the module MS,
S1 to S6 of the circuit I11 are connected to the ports A1 to A6 of the module M9,
S1 to S6 of the circuit I12 are connected to the ports B1 to B6 of the module M9.

In the case of incorrect operation the outputs S1 to S6 of I1 may be connected to the ports B1 to B6 of M2, S1 to S6 of I2 may be connected to the ports B1 to B6 of M1, S1 to S6 of I3 may be connected to the ports B1 to B6 of M1, S1 to S6 of I4 may be connected to the pens B1 to B6 of M2.

In a similar way there are spare links for M4, MS, M6 and M7, MS, M9.

Figure 2:
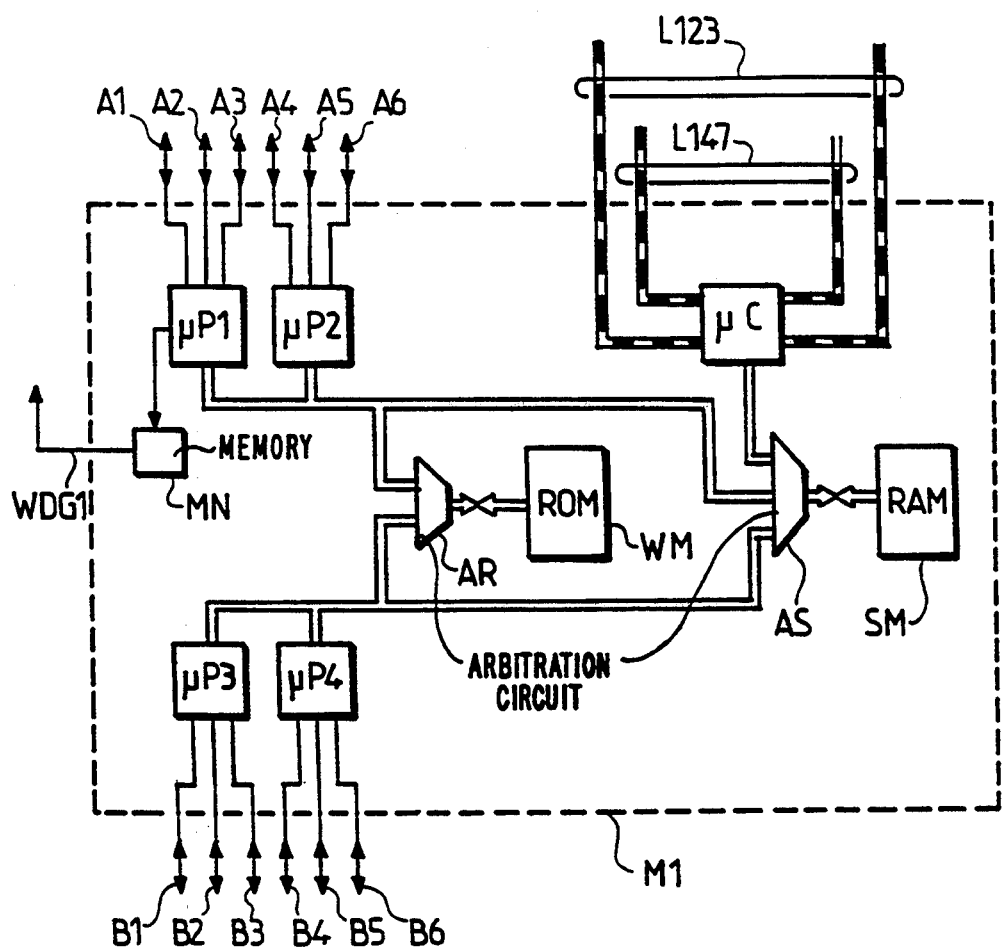
FIG. 2 shows the diagram of a switching module.

FIG. 2 is a more detailed diagram of the switching module M1, the other modules having a similar structure. Said module comprises four microprocessors $\mu$P1, $\mu$P2, $\mu$P3 and $\mu$P4 in a master-slave arrangement ($\mu$P1 and $\mu$P3 being the masters and $\mu$P2 and $\mu$P4 being the respective slaves). Preferably, these microprocessors are of the type MOTOROLA 68302. Each of these microprocessors has three communication ports used as switching ports A1 to A6 and B1 to B6. The ports A1, A2 and A3 are connected to the microprocessor $\mu$P1, the ports A4, A5 and A6 to the microprocessor $\mu$P2, the ports B1, B2 and B3 to the microprocessor $\mu$P3, and the ports B4, B5 and B6 to the microprocessor $\mu$P4. These microprocessors employ a common memory WM. This memory has been loaded with operating programs which can *inter alia* process the routing of the various data to said ports A1 ..., A6, B1, ..., B6. An arbitration circuit AR controls the access to the memory WM for the master-slave combination $\mu$P1 and $\mu$P2 or for the combination $\mu$P3 and $\mu$P4. Said arbitration circuit has been described in the Applicant's French Patent Application FR 90 11 799, filed on Sep. 25 1990. The information to be switched can also be routed to the other modules M2 ..., M9, for example by means of the links L123 and L147. For this purpose a controller μC of a type known as a transputer (for example INMOS T222) is used. A switching memory SM is used to enable the exchange of dam between the microprocessors μP1, μP2, μP3, μP4 and μC. The ports of this common switching memory SM are controlled by another arbitration circuit AS.

To detect the correct operation of the module the memory WM contains a test program, which supplies a correct-operation signal. This program is mainly controlled by a master microprocessor μP1, which addresses a resettable monostable MN in time intervals which are always shorter than its switching time, in such a way that in the case of correct operation the signal transmitted via a line WDG1 connected to the module M1 remains active as long as the module is in good working order.

The outputs of said monostables are thus connected to the lines WDG1 to WDG9 associated with the modules M1 to M9.

Figure 3:
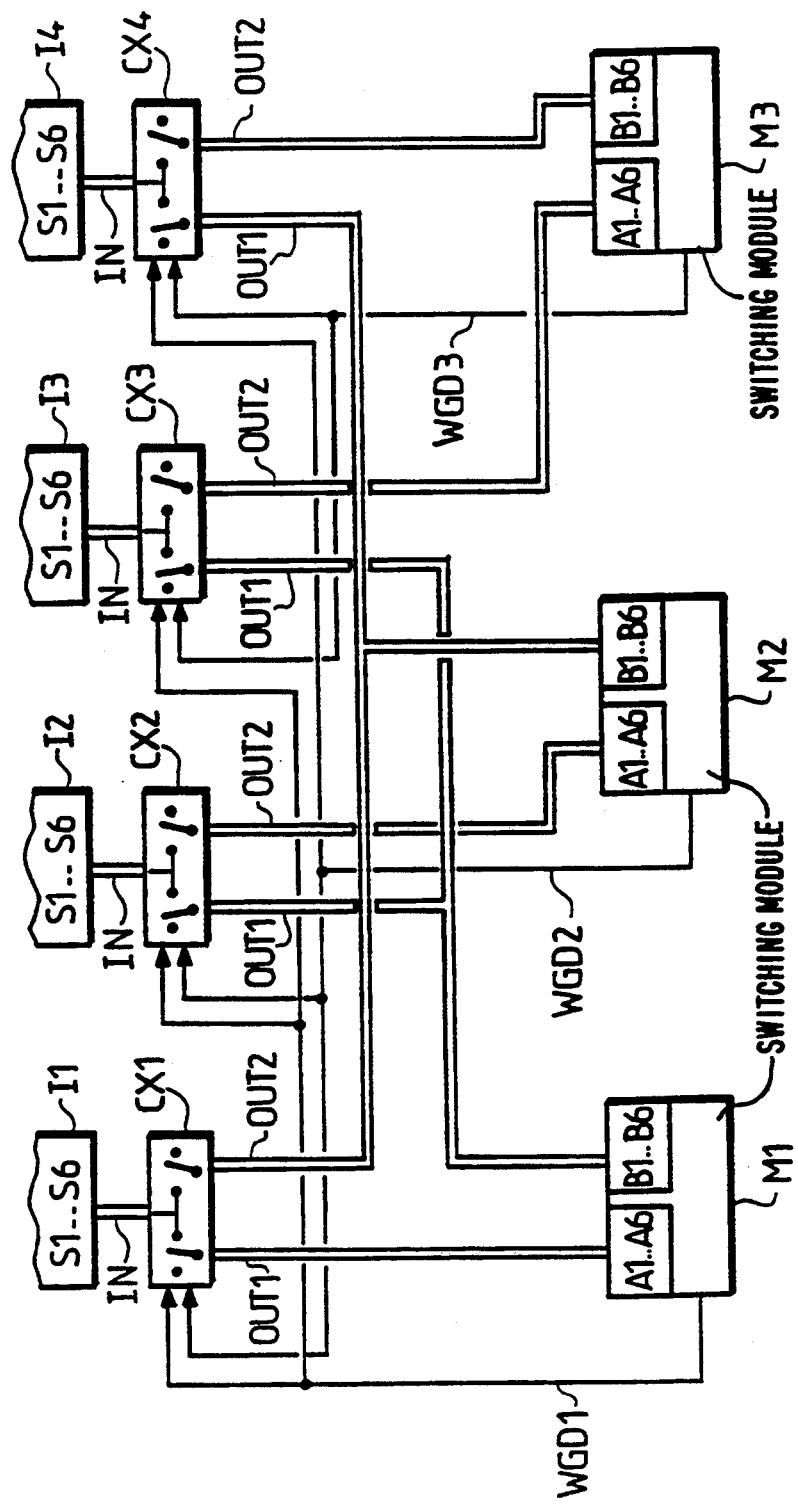
FIG. 3 illustrates the connection network.

FIG. 3 illustrates the connection network. This Figure shows a single row of the device, the other rows being derived therefrom.

The connection network relating to the row comprising the modules M1, M2 and M3 basically comprises four connection circuits CX1, CX2, CX3 and CX4 connected to the interface circuits I1, I2, I3 and I4. These circuits have a port IN connected directly to the ports of the circuits I1 to I4, and two ports OUT1 and OUT2. Once the connections have been established these connection circuits axe defined by the lines WGD1, WGD2 and WGD3. The following Tables give the connections made as a function of the signals produced by these circuits. In the Tables 0 and 1 mean that the signal indicates a correct operation and an incorrect operation respectively, X means that it is indifferent whether the value is 1 or 0,

* means that the output is in the disconnected state (3-state logic).

TABLE 1

| (CX1) | | | |
|---|---|---|---|
| WGD1 | WGD2 | OUT1 | OUT2 |
| 0 | X | I1-M1 | * |
| 1 | 0 | * | I1-M2 |

TABLE 2

| (CX2) | | | |
|---|---|---|---|
| WGD1 | WGD2 | OUT1 | OUT2 |
| X | 0 | * | I2-M2 |
| 0 | 1 | I2-M1 | * |

TABLE 3

| (CX3) | | | |
|---|---|---|---|
| WGD1 | WGD3 | OUT1 | OUT2 |
| X | 0 | * | I3-M3 |
| 0 | 1 | I3-M1 | * |

TABLE 4

| (CX4) | | | |
|---|---|---|---|
| WGD2 | WGD3 | OUT1 | OUT2 |
| X | 0 | * | I4-M3 |
| 0 | 1 | I4-M2 | * |

Note: The system has been designed to provide a back-up for one out of 3 modules in a logic unit (M1-M2-M3, M4-MS-M6, M7-M8-M9).

I claim:

1. A data switching device comprising a first plurality of external ports for connection to the exterior, a second plurality of switching modules comprising a total of said first plurality of switching ports, and a connections network, each of said switching ports being connected to a respective one of said external ports by said connections network, characterized in that said second plurality of switching modules is arranged in a third plurality of groups, each group comprising a respective plurality of said switching modules, and each group having associated therewith the external ports connected to said respective plurality of said switching modules, a fourth plurality, less than said second plurality, of said switching modules each further comprises a respective connection port for backing up a switching port of a switching module which has failed, each of said groups including at least a respective one of said fourth plurality of switching modules, and said connection network includes means for connecting, from each external port associated with a given group, to a respective one of said connection ports of a switching module of said given group, at least one of said connection ports being arranged for backing up at least two of said switching ports.

2. A data switching device as claimed in claim 1, in which the modules each comprises a respective output for supplying information about a correct/incorrect operating condition, and said connections network comprises control inputs, characterized in that said outputs are connected to said control inputs.

3. A data switching device as claimed in claim 2, characterized in that said second plurality is less than said first plurality.

4. A data switching device as claimed in claim 3, characterized in that each connection port is arranged for backing up at least two of said switching ports.

5. A data switching device as claimed in claim 1, characterized in that said second plurality is less than said first plurality.

6. A data switching device as claimed in claim 5, characterized in that each connection port is arranged for backing up at least two of said switching ports.

7. A data switching device comprising a first plurality of external ports for connection to the exterior, and a second plurality of switching modules comprising a total of said first plurality of switching ports, and a connections network, each of said switching ports being connected to a respective one of said external ports by said connections network, characterized in that said second plurality of switching modules is arranged in a third plurality of groups, each group comprising a respective plurality of said switching modules, and each group having associated therewith the external ports connected to said respective plurality of said switching modules, each of said groups comprises a respective link interconnecting the switching modules of said group, and said device further comprises at least one group-connecting link interconnecting between a respective one of the switching modules of each of said third plurality of groups, a fourth plurality, less than said second plurality, of said switching modules each further comprises a respective connection port for backing up a switching port of a switching module which has failed, each of said groups including at least a respective one of said fourth plurality of switching modules, and said connection network includes means for connecting, from each external port associated with a given group, to a respective one of said connection ports of a switching module of said given group, at least one of said connection ports being arranged for backing up at least two of said switching ports.

8. A data switching device as claimed in claim 7, characterized in that each connection port is arranged for backing up at least two of said switching ports.

9. A data switching device as claimed in claim 7, in which the modules each compriseS a respective output for supplying information about a correct/incorrect operating condition, and said connections network comprises control inputs, characterized in that said outputs are connected to said control inputs.

10. A data switching device as claimed in claim 9, characterized in that each connection port is arranged for backing up at least two of said switching ports.

11. A data switching device comprising a first plurality of external ports for connection to the exterior, and a second plurality of switching modules comprising a total of said first plurality of switching ports, and a connections network, each of said switching ports being connected to a respective one of said external ports by said connections network, characterized in that said second plurality of switching modules is arranged in a third plurality of groups, each group comprising a respective plurality of said switching modules, and each group having associated therewith the external ports connected to said respective plurality of said switching modules, each of said groups comprises a respective link interconnecting the switching modules of said group, and said device further comprises at least one group-connecting link interconnecting between a respective one of the switching modules of each of said third plurality of groups, a fourth plurality, less than said second plurality, of said switching modules each further comprises a respective connection port for backing up a switching port of a switching module which has failed, each of said groups including at least a respective one of said fourth plurality of switching modules, and said connection network includes means for connecting, from each external port associated with a given group, to a respective one of said connection ports of a switching module of said given group, each connection port being arranged for backing up at least two of said switching ports.

12. A data switching device as claimed in claim 11, in which the modules each comprises a respective output for supplying information about a correct/incorrect operating condition, and said connections network comprises control inputs, characterized in that said outputs are connected to said control inputs.

13. A data switching device as claimed in claim 12, characterized in that each connection port is arranged for backing up at least two of said switching ports.

14. A data switching device as claimed in claim 11, characterized in that each connection port is arranged for backing up at least two of said switching ports.

* * * * *